US012327967B2

(12) United States Patent
Bunke

(10) Patent No.: US 12,327,967 B2
(45) Date of Patent: Jun. 10, 2025

(54) MULTIPLE CONNECTOR ASSEMBLY AND METHOD FOR MANUFACTURING THE SAME

(71) Applicant: ITT MANUFACTURING ENTERPRISES LLC, Wilmington, DE (US)

(72) Inventor: Carl Rodney Bunke, Irvine, CA (US)

(73) Assignee: ITT MANUFACTURING ENTERPRISES LLC, Stamford, CT (US)

( * ) Notice: Subject to any disclaimer, the term of this patent is extended or adjusted under 35 U.S.C. 154(b) by 507 days.

(21) Appl. No.: 17/790,773

(22) PCT Filed: Feb. 10, 2020

(86) PCT No.: PCT/US2020/017419

§ 371 (c)(1),
(2) Date: Jul. 5, 2022

(87) PCT Pub. No.: WO2021/162672

PCT Pub. Date: Aug. 19, 2021

(65) Prior Publication Data

US 2023/0032231 A1 Feb. 2, 2023

(51) Int. Cl.
*H01R 31/06* (2006.01)
*H01R 13/502* (2006.01)
(Continued)

(52) U.S. Cl.
CPC ........... *H01R 31/06* (2013.01); *H01R 13/502* (2013.01); *H01R 13/5202* (2013.01);
(Continued)

(58) Field of Classification Search
CPC ........ H01R 31/06; H01R 13/04; H01R 13/24; H01R 13/502; H01R 13/5202;
(Continued)

(56) References Cited

U.S. PATENT DOCUMENTS 5,830,001 A * 11/1998 Kinoshita .......... H01R 13/6271 439/680
6,210,216 B1 * 4/2001 Tso-Chin ............. H01R 13/748 439/701
(Continued)

FOREIGN PATENT DOCUMENTS

CN 202009124 U 10/2011
CN 104577587 A 4/2015
WO 2019233762 A1 12/2019

OTHER PUBLICATIONS

International Search Report and Written Opinion for International App No. PCT/US20/17419, mailed on Jun. 5, 2020, pp. 11.
(Continued)

*Primary Examiner* — Abdullah A Riyami
*Assistant Examiner* — Amara Anderson
(74) *Attorney, Agent, or Firm* — Turk IP Law, LLC

(57) ABSTRACT

Technologies are generally described for multiple individual connectors in a single connector assembly. The individual connectors may be any form-fit suitable connectors such as USB type connectors and similar ones. The connector assembly may be circular, oval, rectangular, or other shapes. Coupling between the plug and receptacle of the connector assembly may be through threads, pressure, a click-on mechanism, screws, or other compatible mechanisms. Off-the-shelf individual connectors may be fitted with a module adaptor, then inserted into an accordingly shaped inside portion of the outer shell, and held in place through a latching mechanism or similar. Alternatively, the connector assembly may be formed with the individual connectors and
(Continued)

cabling may be added subsequently. In some examples, post retention or backshell retention may be implemented in conjunction with the plug connectors.

15 Claims, 8 Drawing Sheets

(51) Int. Cl.

| | |
|---|---|
| ***H01R 13/52*** | (2006.01) |
| ***H01R 13/629*** | (2006.01) |
| ***H01R 13/6581*** | (2011.01) |
| ***H01R 25/00*** | (2006.01) |
| ***H01R 27/02*** | (2006.01) |

(52) U.S. Cl.
CPC ....... *H01R 13/629* (2013.01); *H01R 13/6581* (2013.01); *H01R 25/003* (2013.01); *H01R 27/02* (2013.01); *H01R 2201/06* (2013.01)

(58) Field of Classification Search
CPC .............. H01R 13/629; H01R 13/6271; H01R 13/6315; H01R 13/64; H01R 13/6581; H01R 11/03; H01R 25/003; H01R 27/02; H01R 2201/06
USPC .......................................................... 439/271
See application file for complete search history.

(56) References Cited

U.S. PATENT DOCUMENTS

| | | | | |
|---|---|---|---|---|
| 6,722,924 | B1 * | 4/2004 | Zhou .................... | H01R 13/659 439/607.23 |
| 6,948,977 | B1 * | 9/2005 | Behrent ............... | H01R 13/659 439/607.01 |
| 8,672,696 | B2 * | 3/2014 | Sakurai .............. | H01R 13/6315 439/247 |
| 9,270,038 | B1 | 2/2016 | Chao | |
| 10,855,038 | B1 * | 12/2020 | Horning ............... | H01R 13/518 |
| 2009/0246997 | A1 * | 10/2009 | Moller ................... | H01R 13/62 439/352 |
| 2012/0270431 | A1 * | 10/2012 | Foltz .................... | H01R 13/514 439/374 |
| 2012/0329316 | A1 * | 12/2012 | Wu .................... | H01R 13/6315 439/518 |
| 2016/0164233 | A1 * | 6/2016 | Zhu ........................ | H01R 24/50 439/248 |

OTHER PUBLICATIONS

European Search Report for application No. 20918467.0 mailed Oct. 10, 2023, 9 pages.

* cited by examiner

MULTIPLE CONNECTOR ASSEMBLY AND METHOD FOR MANUFACTURING THE SAME

CROSS-REFERENCE TO RELATED APPLICATIONS

The present application is a U.S. National Stage filing under 35 U.S.C. § 371 of International Application PCT/US20/17419, filed Feb. 10, 2020.

BACKGROUND

Unless otherwise indicated herein, the materials described in this section are not prior art to the claims in this application and are not admitted as prior art by inclusion in this section.

Connectors are electro-mechanical components that provide for exchange or power and/or communication signals between distinct electrical devices and systems. A typical connector system includes a plug and a receptacle, which fit together mechanically and provides one or more electrical connections. The mechanical portion may include various forms of coupling such as threaded coupling, click-on coupling, pressure-fit coupling, and similar ones. Depending on a purpose and functionality of a connector system, various materials such as plastic, metal, ceramic, etc. may be used. Connectors may include additional functionalities such as environmental protection, heat resistance, electromagnetic shielding, and so on. Some connector systems are standardized, where size, dimension, signal levels, or even materials are defined by an industry or government standard. Other connectors systems may be proprietary.

SUMMARY

The present disclosure generally describes multiple connector assemblies that combine multiple individual connectors in one assembly.

According to some examples, a connector assembly is described. The connector assembly may include a plug assembly and a receptacle assembly. The plug assembly may include a first shell; a first insulator portion arranged to be fitted inside the first shell, the first insulator portion having two or more cavities; two or more module adaptors arranged to fit into the two or more cavities of the first insulator portion; and two or more plug connectors including a plurality of electrical connections, where each plug connector is encapsulated by a module adaptor of the plug assembly in a cavity of the first insulator and at least one plug connector floats along one or more axes relative to a mating surface of the plug assembly. The receptacle assembly may include a second shell; a second insulator portion arranged to be fitted inside the second shell, the second insulator portion having two or more cavities; two or more module adaptors arranged to fit into the two or more cavities of the second insulator portion; and two or more receptacle connectors including a plurality of electrical connections, where each receptacle connector is encapsulated by a module adaptor of the receptacle assembly in a cavity of the second insulator portion, at least one receptacle connector is configured to float along one or more axes relative to a mating surface of the receptacle assembly, and portions of the two or more plug connectors protrude from the mating surface of the plug assembly to mate with corresponding receptacle connectors of the receptacle assembly.

According to other examples, the connector assembly of may further include a latching mechanism within the first insulator portion to secure one of the two or more plug connectors. The latching mechanism may include a finger latch made from a same material as the first insulator portion or a retention clip made from a different material as the first insulator portion; and the connector assembly may further include an insertion opening on the mating surface of the plug assembly for insertion of a removal tool to release the latching mechanism. The plug connectors may be electrically isolated from each other; and/or the receptacle connectors may be electrically isolated from each other. The two or more plug connectors and the two or more receptacle connectors may be hardwired to respective circuit boards, wired to individual cables, or wired to cables bundled together for the plug assembly or the receptacle assembly. The plug assembly and the receptacle assembly may be configured to mate through an O-ring on an inside surface of the first shell and a corresponding groove on an outside surface of the second shell.

According to further examples, the plug assembly and the receptacle assembly may be configured to mate through matching sets of threads on an inside surface of the first shell and an outside surface of the second shell or a set of screws to hold the first shell and the second shell together. A material and a shape of one or more of the first shell, the second shell, the first insulator portion, the second insulator portion, or the two or more module adaptors may be selected such that the plug assembly and/or the receptacle assembly are ruggedized, environmentally sealed, or electromagnetically shielded. The two or more plug connectors and the two or more receptacle connectors may include universal serial bus (USB) standard version 3.0 (or higher) category C type connectors, USB version 2.0 category B micro style connectors, USB version 2.0 or version 3.0 category B mini style connectors, or High-Definition Multimedia Interface (HDMI) style connectors arranged parallel, perpendicular, or at a predefined angle to each other.

According to other examples, a connector assembly is described. The connector assembly may include a plug assembly and a receptacle assembly. The plug assembly may include a first shell; a first insulator portion arranged to be fitted inside the first shell; and two or more plug connectors partially within the first insulator portion, where the first insulator portion is molded over the two or more plug connectors, each plug connector includes a plurality of electrical connections, and each plug connector is electrically isolated from other plug connectors. The receptacle assembly may include a second shell; a second insulator portion arranged to be fitted inside the second shell; and two or more receptacle connectors within the second insulator portion, where the second insulator portion is molded over the two or more receptacle connectors, each receptacle connector includes a plurality of electrical connections, each receptacle connector is electrically isolated from other receptacle connectors, and portions of the two or more plug connectors protrude from a surface of the plug assembly to mate with corresponding receptacle connectors of the receptacle assembly.

According to some examples, the connector assembly may further include an elastomer or mechanical spring configured to surround a portion of each plug connector; seal the first shell; and provide a preload between the first shell and the two or more receptacle connectors. The connector assembly may also include a rear insulator anchored to the first insulator portion via one or more posts and retainer clips. The connector assembly may further include a backshell mechanically coupled to the first shell and configured to retain the rear insulator. The plug assembly and the connector assembly may be configured to mate through an O-ring on an inside surface of the first shell and a corresponding groove on an outside surface of the second shell; matching sets of threads on the inside surface of the first shell and the outside surface of the second shell; or a set of screws to hold the first shell and the second shell together.

According to further examples, a method for manufacturing a connector assembly is described. The method may include forming a plug assembly by forming a first insulator portion with two or more cavities and a first mating surface; forming a first module adaptor arranged to fit into one of the two or more cavities of the first insulator portion; encapsulating a plug connector that includes a plurality of electrical connections with the first module adaptor; fitting two or more first module adaptors with respective plug connectors into the two or more cavities of the first insulator portion such that portions of the plug connectors protrude from the first mating surface of the plug assembly and at least one of the plug connectors float along one or more axes relative to the first mating surface; and fitting the first insulator portion with the two or more first module adaptors into a first shell. The method may also include forming a receptacle assembly by forming a second insulator portion with two or more cavities and a second mating surface; forming a second module adaptor arranged to fit into one of the two or more cavities of the second insulator portion; encapsulating a receptacle connector that includes a plurality of electrical connections with the second module adaptor; fitting two or more second module adaptors with respective receptacle connectors into the two or more cavities of the second insulator portion such that the receptacle connectors align with corresponding apertures on the second mating surface to mate with corresponding plug connectors of the plug assembly and at least one of the receptacle connectors floats along one or more axes relative to the second mating surface; and fitting the second insulator portion with the two or more second module adaptors into a second shell.

According to some examples, the method may also include forming a latching mechanism within the first insulator portion to secure the first module adaptor by forming a finger latch made from a same material as the first insulator portion or a retention clip made from a different material as the first insulator portion; and forming an insertion opening on the first mating surface for insertion of a removal tool to release the latching mechanism. The method may further include one or more of hardwiring the plug connectors and the receptacle connectors to respective circuit boards, wiring the plug connectors and the receptacle connectors to individual cables, or wiring the plug connectors and the receptacle connectors to cables bundled together for the plug assembly or the receptacle assembly. The method may also include forming one or more of an O-ring on an inside surface of the first shell and a corresponding groove on an outside surface of the second shell to mate the plug assembly and the receptacle assembly; forming matching sets of threads on the inside surface of the first shell and the outside surface of the second shell to mate the plug assembly and the receptacle assembly; or forming a set of screw holes on the first shell and the second shell to hold the plug assembly and the receptacle assembly together.

According to other examples, a universal serial bus (USB) connector assembly is described. The USB connector assembly may include a plug assembly that includes a first shell; a first insulator portion arranged to be fitted inside the first shell, the first insulator portion having two or more cavities; two or more module adaptors arranged to fit into the two or more cavities of the first insulator portion; and two or more USB plug connectors arranged parallel, perpendicular, and/or at an angle to each other, where each USB plug connector is encapsulated by a module adaptor of the plug assembly in a cavity of the first insulator portion, floats along one or more axes relative to a mating surface of the plug assembly, and protrudes from the mating surface of the plug assembly. The USB connector assembly may also include a receptacle assembly that includes a second shell; a second insulator portion arranged to be fitted inside the second shell, the second insulator portion having two or more cavities; and two or more USB receptacle connectors arranged to fit into the two or more cavities of the second insulator portion, where the USB receptacle connectors align with apertures on a mating surface of the receptacle assembly to match corresponding two or more USB plug connectors and the USB receptacle connectors.

According to further examples, the USB connector assembly may also include a latching mechanism within the first insulator portion to secure the two or more USB plug connectors, the latching mechanism comprising a finger latch made from a same material as the first insulator portion or a retention clip made from a different material as the first insulator portion; and an insertion opening on the mating surface of the plug assembly for insertion of a removal tool to release the latching mechanism. The plug assembly and the connector assembly may be configured to mate through an O-ring on an inside surface of the first shell and a corresponding groove on an outside surface of the second shell; matching sets of threads on the inside surface of the first shell and the outside surface of the second shell; or a set of screws to hold the first shell and the second shell together.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
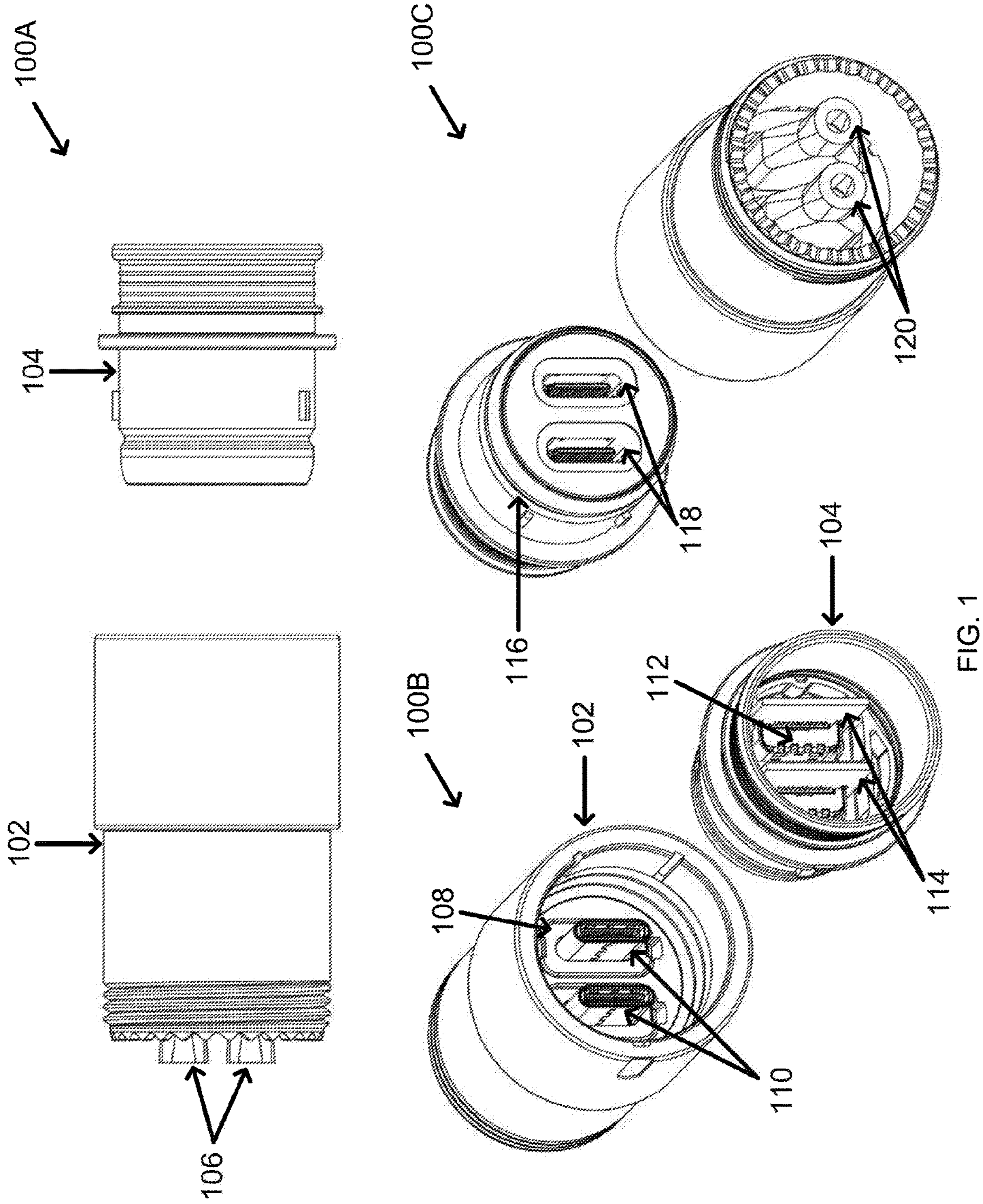
FIG. 1 illustrates various views of a plug-receptacle pair of an example connector assembly that combines two USB type connectors.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods of manufacture, apparatus, systems and/or devices associated with multiple connector assemblies that combine multiple individual connectors in one assembly.

Briefly stated, technologies are generally described for multiple individual connectors in a single connector assembly. The individual connectors may be any form-fit suitable connectors such as USB type connectors and similar ones. The connector assembly may be circular, oval, rectangular, or other shapes. Coupling between the plug and receptacle of the connector assembly may be through threads, pressure, a click-on mechanism, screws, or other compatible mechanisms. Off-the-shelf individual connectors may be fitted with a module adaptor, then inserted into an accordingly shaped inside portion of the outer shell, and held in place through a latching mechanism or similar. Alternatively, the connector assembly may be formed with the individual connectors and cabling may be added subsequently. In some examples, post retention or backshell retention may be implemented in conjunction with the plug connectors.

Disclosed herein are connector assemblies with multiple individual connectors combined in a single assembly. An example connector assembly may include two or more connectors that preserve their form and function, while providing multiple connection pathways between two or more devices. For example, an example connector assembly may include 4 (Universal Serial Bus) USB connectors in one connector body, thus allowing four different USB connections through a single connector assembly. The individual connectors may be coupled to cables and/or electrical circuit boards. While some examples are described using USB connectors as illustrative examples, embodiments are not limited to USB type connectors. Any standardized or proprietary connectors may be combined in a connector assembly using the principles described herein.

USB type connectors are connectors that comply with the various USB standards defined by the International Telecommunications Union (ITU). Originally intended for computer-to-computer and computer-to-peripheral device connections, USB connectors are found in a wide spectrum of usage implementations providing electrical connectivity between large numbers and types of devices. Sizes and shapes of various USB connectors depend on applicable standard and the different connectors are named after the applicable standards, such as USB-A, USB-B, USB-C. Under each standard, there may be different sizes such as mini, micro, etc. As data speeds increased, versions of the standards defining number of connections and signal types for the individual connections have also changed resulting in different versions such as USB 2.0, USB 3.0, etc.

FIG. 1 illustrates various views of a plug-receptacle pair of an example connector assembly that combines two USB type connectors, arranged in accordance with at least some embodiments described herein.

Diagram 100A in FIG. 1A includes a side view of a plug 102 containing two USB type plug connectors with their individual cables 106 and a matching receptacle 104 containing two USB type receptacle connectors. Diagram 100B includes a perspective view of a front of the plug 102 with two USB type connectors 108 in a shell 110 and the rear of the matching receptacle 104 with the two matching USB type receptacles 112, which are terminated in respective circuit boards 114. Diagram 100C shows a perspective view of a front of the matching receptacle 104 with the front views of the USB type receptacles 118 within a shell 116 and rear view of the USB type plugs 120, which are terminated in respective cables.

With the proliferation of computing devices and peripherals, the variety and number of interconnectivity mechanisms including different power and communication cabling has increased dramatically. The trend in interconnectivity has been toward smaller size and denser connectors and cables carrying higher speeds of data. However, a challenge that has presented itself is managing increasingly higher number of connections. While wireless connectivity is increasingly popular, some environments (e.g., higher electromagnetic noise environments, secure communication needs, etc.) still require wired connections. Wired connection consolidator modules that combine multiple connectors are one solution, but they are usually cumbersome and do not lend themselves to environments where robustness is a requirement (e.g., military use, mobile environments, hazardous environments, etc.).

Example embodiments provide multiple individual connectors in a single connector assembly (outer shell), where cabling for the individual connectors may be combined as a bundle or include separate individual cables. The individual connectors may be any form-fit suitable connectors such as USB type connectors and similar ones. The individual connectors may include multiple electrical connections for power, data, and other electrical signaling exchange, and be electrically isolated from each other. Thus, the individual connectors are functionally distinct connectors mechanically coupled with their matching counterparts simultaneously through the connector assembly. In some examples, some electrical connections such as ground, shielding, etc. may be shared between the individual connectors through the construction of the connector assembly.

The connector assembly (outer shell) may be circular, oval, rectangular, or other shapes. Coupling between the plug and receptacle of the connector assembly may be through threads, pressure, a click-on mechanism (e.g., use of latches), screws, or other compatible mechanisms. In some examples, off-the-shelf individual connectors may be fitted with a module adaptor, then inserted into an accordingly shaped inside portion of the outer shell, and held in place through a latching mechanism or similar. In this modular example, the connectors assembly may be designed for a predefined number of individual connectors (e.g., 6), but some spaces may be left empty (e.g., 2) resulting in connectors assemblies with desired number of individual connectors. In other examples, the connector assembly may be formed with the individual connectors and cabling may be added subsequently. Various connector features such as environmental insulation, ruggedization, shielding, etc. may be incorporated into the outer shell and/or the individual connectors. In some examples, the individual connectors may include pins or a mid-plate with tongues that may be coupled directly to wires of a cable (e.g., individual connectors 108). In other examples, a circuit board (e.g., circuit boards 114) may be used to terminate wires of the cables and connect to the pins or mid-plate tongues. Alternatively, the circuit board (or the pins) may also be hard-wired to another circuit board of a device.

Figure 2A:
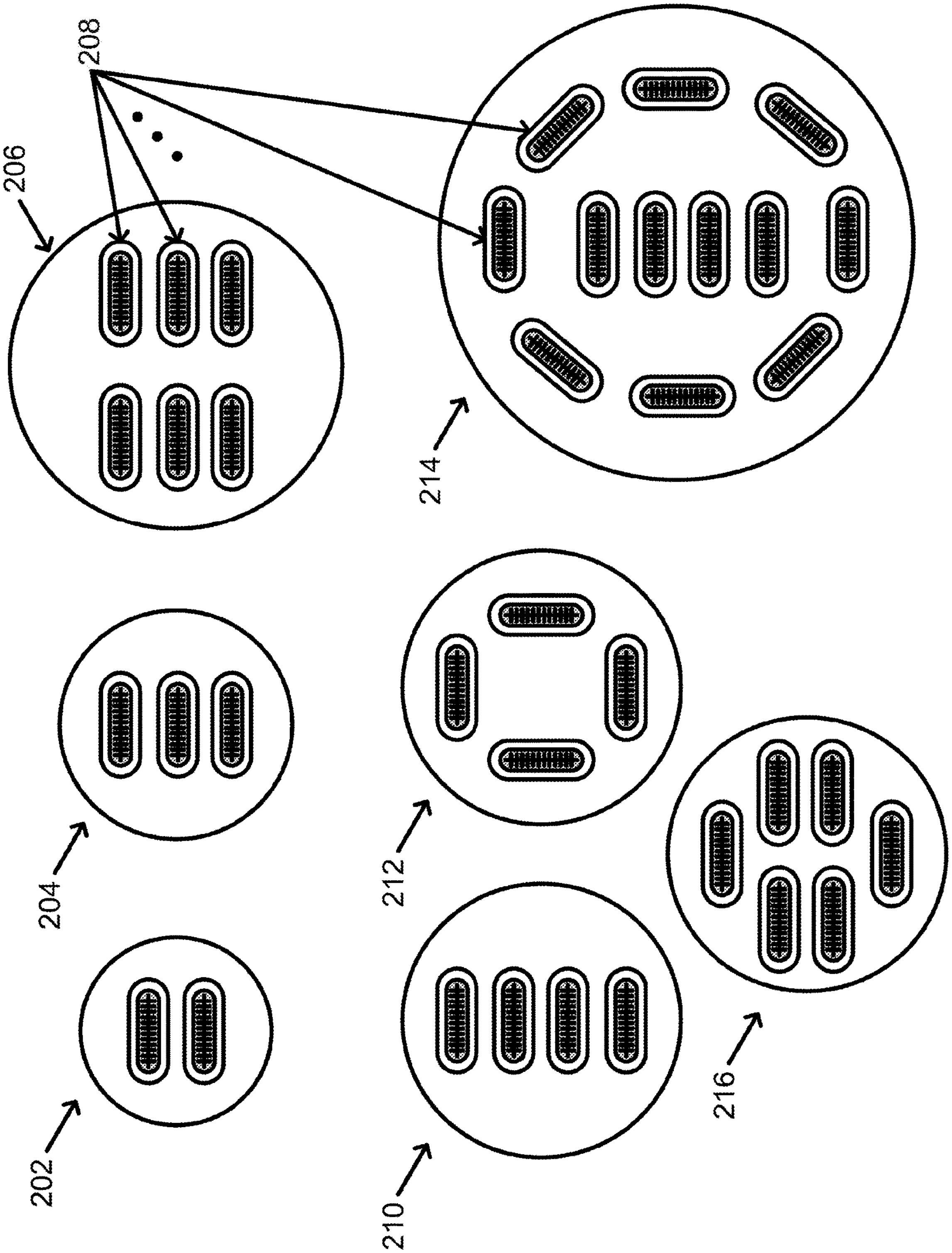
FIG. 2A illustrates example configurations of various USB type connectors in a single connector assembly.

FIG. 2A illustrates example configurations of various USB type connectors in a single connector assembly, arranged in accordance with at least some embodiments described herein.

The examples configurations in FIG. 2A include configuration 202 with two USB type plugs 208 arranged in parallel to each other, configuration 204 with three USB type plugs 208 arranged in parallel to each other, and configuration 206 with six USB type plugs 208 arranged in two groups of three plugs parallel to each other. The example configurations further include configuration 210 with four USB type plugs 208 arranged in parallel to each other, configuration 212 with four USB type plugs 208 arranged perpendicular to each other, and configuration 216 with six USB type plugs 208 arranged in parallel to each other in groups. Yet another example configuration in FIG. 2A includes configuration 214, where six USB type plugs are arranged in parallel to each other and six additional USB type plugs are arranged at an angle along an inner perimeter of the connector assembly.

The configurations shown in FIG. 2A are for illustration purposes only and are not intended as limitations on embodiments. A number of individual connectors (e.g., USB type plugs or receptacles) may be any practical number depending on the size and functionality of the individual connectors. For example, in USB type connectors, 10-20 may be a practical range for implementation purposes. Another consideration in selecting a number of the individual connectors to combine may be dimension and clearance requirements imposed by practical design considerations and/or standards. Additional features of the connector assembly such as shielding, heat resistance, insulation may also affect the number of connectors to be combined by imposing limitations on the connector assembly dimensions and material types.

Figure 2B:
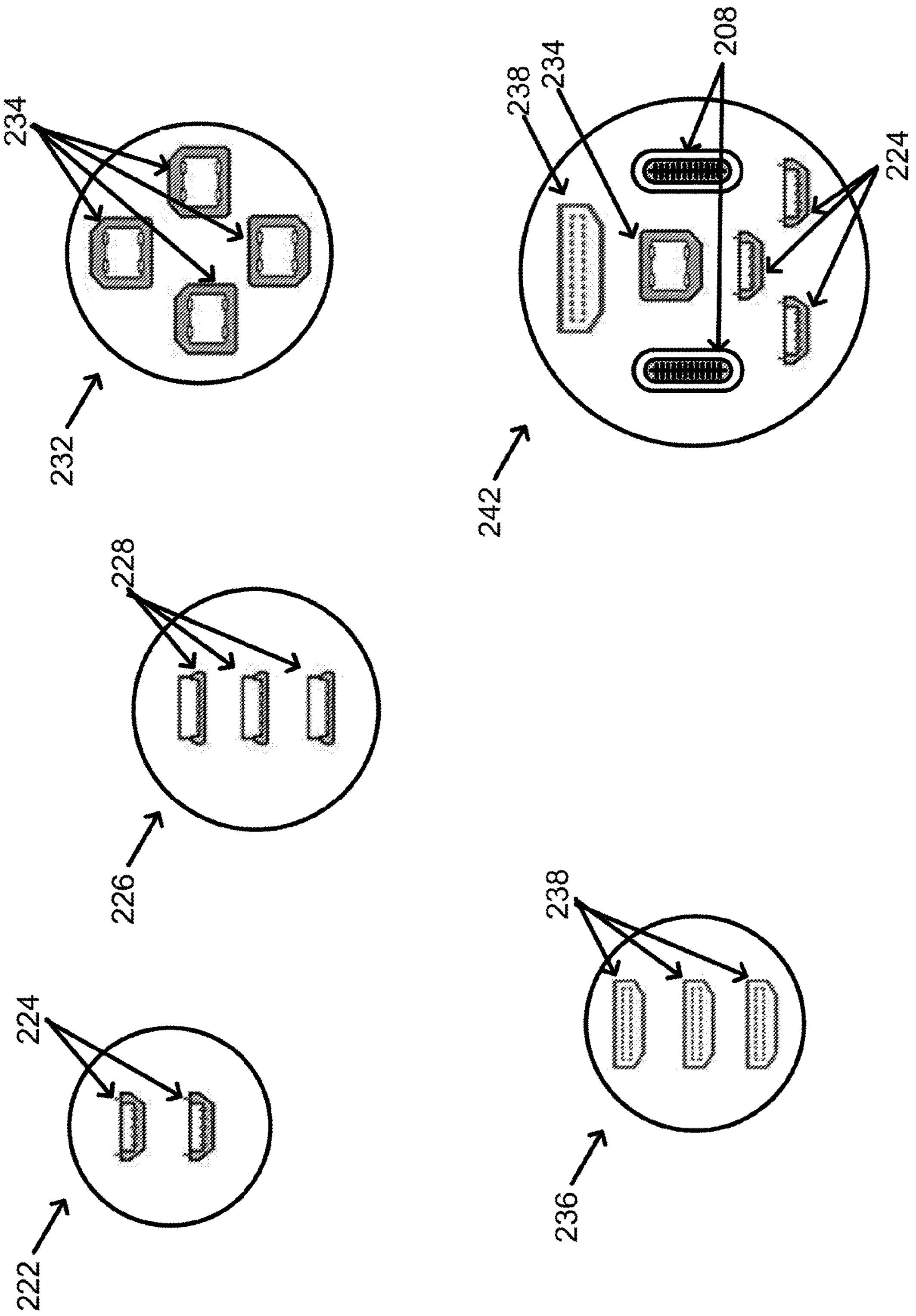
FIG. 2B illustrates example configurations of different types of connectors in a single connector assembly.

FIG. 2B illustrates example configurations of different types of connectors in a single connector assembly, arranged in accordance with at least some embodiments described herein.

The individual connectors shown in FIG. 2A represent (as example) USB standard version 3.0 (or higher) category C type connectors. FIG. 2B shows various examples of other types of connectors that may be combined in a connector assembly according to embodiments in different illustrative configurations. Example configuration 222 includes two USB version 2.0 category B micro style connectors 224 arranged in parallel to each other. Example configuration 226 includes three USB version 2.0 or version 3.0 category B mini style connectors 228 arranged in parallel to each other. Example configuration 232 includes four USB version 2.0 category B style connectors 234 arranged perpendicular to each other. Example configuration 236 includes three High-Definition Multimedia Interface® (HDMI®) style connectors 238 arranged in parallel to each other.

Example configuration 242 includes an HDMI® connector 238, a USB version 2.0 category B style connector 234, two USB version 3.0 category C style connectors 208, and three USB version 2.0 category B micro style connectors 224 combined together in a single connector assembly. Thus, different types and/or numbers of connectors may be combined in a single connector assembly. As discussed above, in USB type connectors, 10-20 may be a practical range for implementation purposes. For smaller size connectors, higher numbers of the individual connectors may be combined, whereas for larger size connectors, a smaller number of individual connectors may be combined. A common feature of the various types of individual connectors discussed herein is that they include multiple electrical connections and may be electrically isolated from each other when combined in a connector assembly according to example embodiments.

The individual connectors are in pairs of plug and receptacle connectors. In some examples, portions of the plug connectors may protrude from a mating surface of a plug assembly combining multiple plug connectors and mate with portions of receptacle connectors protruding from a mating surface of a matching receptacle assembly. In other examples, the protruding portions of the individual plug connectors may mate with receptacle connectors fitted the receptacle assembly and accessible through apertures on the mating surface of the receptacle assembly (not protruding).

Figure 3:
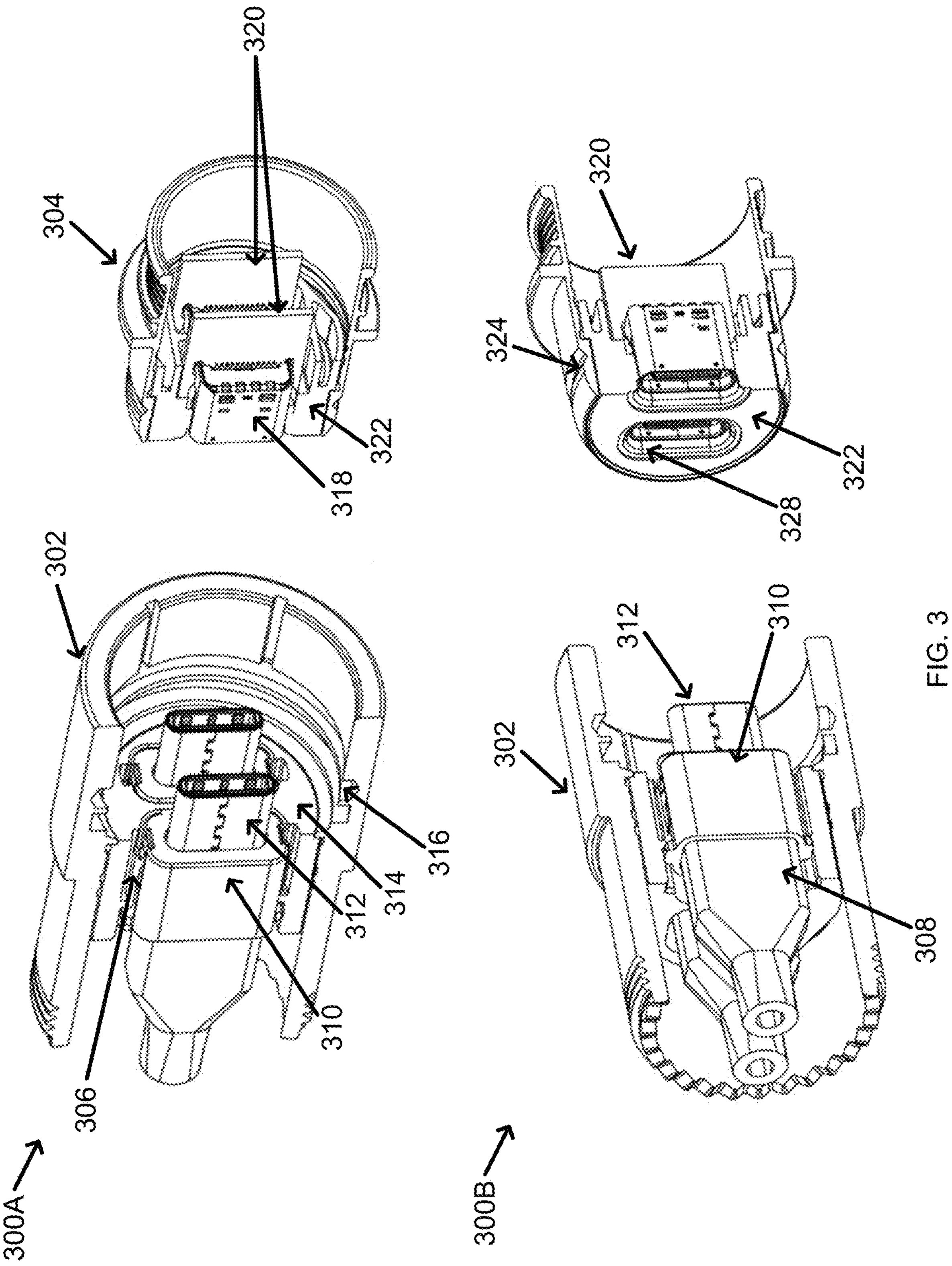
FIG. 3 illustrates cutaway perspective installation views of a plug-receptacle pair of an example connector assembly.

FIG. 3 illustrates cutaway perspective installation views of a plug-receptacle pair of an example connector assembly, arranged in accordance with at least some embodiments described herein.

The cutaway view 300A in FIG. 3 shows two individual USB style connectors arranged in parallel within a first molded insulator portion 314 of the first outer shell 302 of a plug connector assembly. The individual plug connectors include conductive shells 312 and electrical terminals inside the conductive shells 312. A module adaptor 310 may be overmolded, bonded, or mechanically attached to each individual plug connector. The first molded insulator portion 314 may include a latch section 306 on opposing sides of the individual plug connector configured to latch onto a corresponding portion of the module adaptor 310. The cutaway view 300A also shows a receptacle connector assembly outer shell 304 (second outer shell 304) housing two matching USB style receptacle connectors 318 arranged in parallel within a second molded insulator portion 322. The receptacle connectors 318 may include respective circuit boards 320 for electrical connection to cables or hardwiring to a circuit board of an electrical device.

The module adaptor 310 may be made from thermoplastic elastomer in some examples and include an integral O-ring for sealing the individual plug connector. In other examples, an insertion opening may be designed in front of the latch section 306 of the first insulator portion 314 to allow use of a connector removal tool to release the latch mechanism and remove the individual plug connector from the plug connector assembly. In further examples, dampening material (e.g., rubber) may be added to the latch section 306 to avoid accidental release of the individual plug connector or to allow for smoother insertion. In yet other examples, an O-ring and/or a spiral ring in the first groove 316 may be used to stabilize the coupling of the connector assembly plug and the connector assembly receptacle. O-ring and/or the spiral ring in the first groove 316 may also be used to provide enhanced electrical coupling for shielding purposes in cases of shielded connector assemblies or to provide sealing in environmentally insulated connector assemblies.

The cutaway view 300B in FIG. 3 shows the plug and receptacle connector assemblies with two USB style connectors of cutaway view 300B from a different perspective. On the receptacle connector assembly, a second groove 324 is shown in a proximal portion of the second outer shell 304. The second groove 324 with the spiral ring inside the plug connector assembly (in the first groove 316) may be used as a latching mechanism for the connector assemblies keeping them together in a breakaway style, which may further include electromagnetic shielding. A lead-in chamfer 328 may help guide in the corresponding plug connectors into the receptacle connectors. The chamfer may be designed at a selected angle such as 45 degrees or others. The "floating" feature of the plug connectors described previously in combination with the chamfer design on the receptacle connector may provide enhanced alignment when plug and receptacle assemblies are mated with multiple connectors each.

Figure 4:
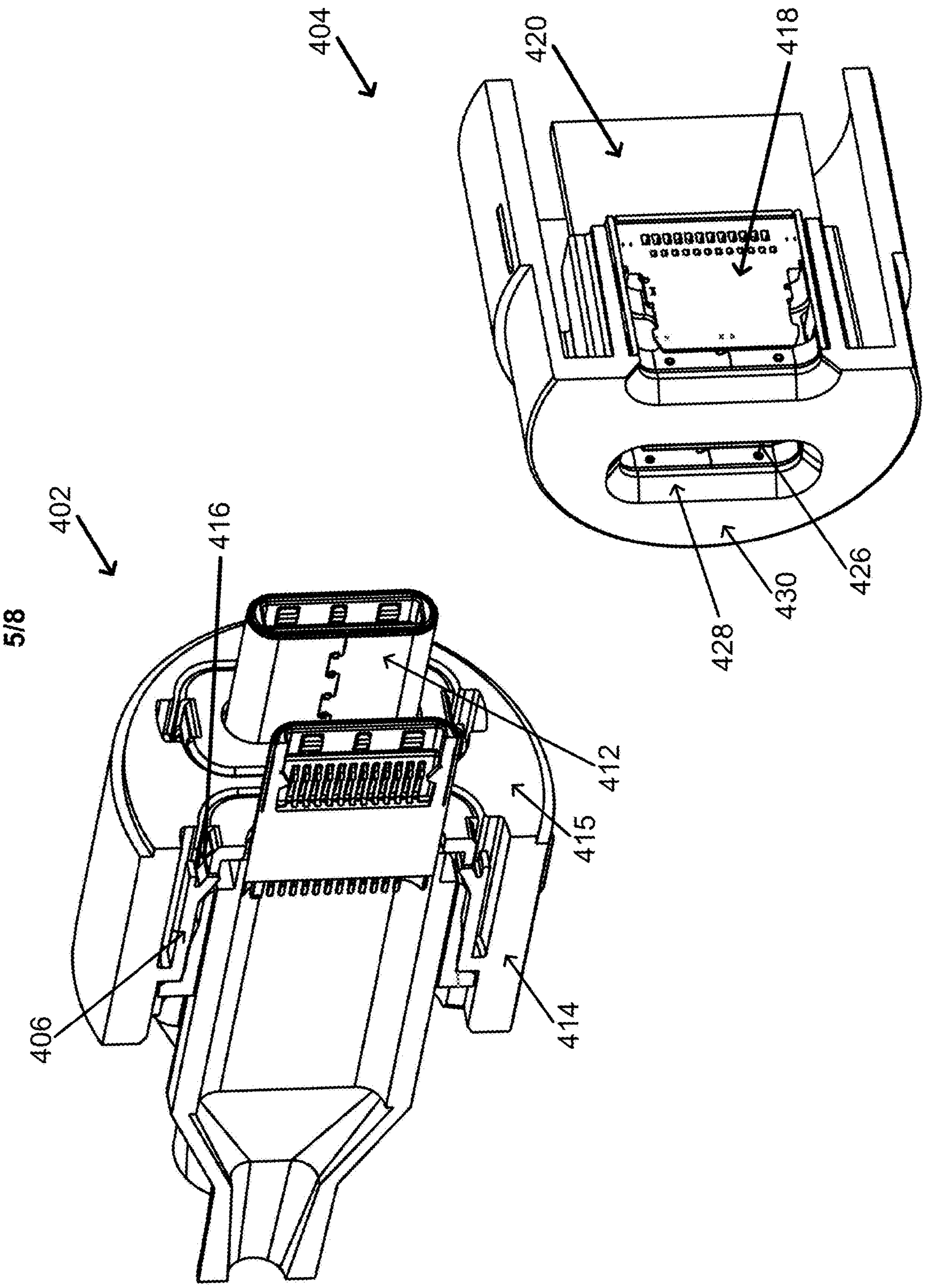
FIG. 4 illustrates cutaway perspective installation views of a plug-receptacle pair of an example connector assembly showing retention details for one configuration.

FIG. 4 illustrates cutaway perspective installation views of a plug-receptacle pair of an example connector assembly showing retention details for one configuration, arranged in accordance with at least some embodiments described herein.

A plug connector assembly 402 and a receptacle connector assembly 404 are shown in FIG. 4. Plug connector assembly 402 includes two USB style plug connectors 408 arranged in parallel to each other. The plug connectors 408 may be fitted in a module adaptor 410 and inserted into an insulator portion 414 of the plug connector assembly 402. Conductive shells 412 of the plug connectors may protrude from the module adaptors 410 (and front face of the plug connector assembly 402). The insulator portion 414 may also include two (or more) latch mechanisms 406 to hold the module adaptor 410 (and thereby the plug connector 408) in place. The latching mechanism 406 may include a finger mechanism made from the same material as the insulator portion 414 or similar. An insertion opening 416 in front of the latch mechanism 406 of the insulator portion 414 may allow use of a connector removal tool to release the latch mechanism and remove the individual plug connector from the plug connector assembly 402.

In some examples, the module adaptor 410 and the latching mechanism 406 may be configured to allow the plug connector 408 to "float", that is, the conductive shell 412 of the plug connector 408 may be movable in small amounts along two or three axes for easier mating with corresponding receptacle connectors in the receptacle connector assembly 404. For example, the conductive shell 412 may be movable between 0 and 3 degrees along two orthogonal axes parallel to a mating surface 415 of the plug connector assembly 402. That way, if one or more apertures on a front face 430 of the receptacle connector assembly 404 do not match exactly the locations of the conductive shells, one or more conductive shells may be eased into their corresponding apertures by moving along the axes as the two assemblies are pushed together. In other examples, the plug connectors may also be movable along a third axis vertical to the two axes defining the plane of the mating surface 415. The movability of the plug connectors is for ease of mating between the plug connector assembly and the receptacle connector assembly. Thus, the example movement range (0 to 3 degrees) is intended as an illustrative example. Smaller or slightly larger ranges may also be used. The movement along the third axis may allow complete mating between the plug connector assembly and the receptacle connector assembly even if one (or more) conductive shell(s) cannot be inserted completely into their corresponding receptacle connector. For example, if one conductive shell has 0.1 inch excess length, the movement along the third axis may allow it to be pulled back by 0.1 inch and the mating surfaces of the plug connector assembly and the receptacle connector assembly may still touch each other completely.

The floating movement of the plug connectors may be enabled by size and material of the module adaptors 410 and/or the latching mechanism 406. For example, the module adaptors 410 may be made from semiflexible material allowing the plug connectors movement in place. In another example, the size and shape of the module adaptors may be selected such that the plug connectors are not released from the plug connector assembly but are capable of small movements while the connector assemblies are being mated. In yet other examples, the latching mechanism 406 may provide a small space for floating movement to the module adaptor (and thereby the plug connector. As shown in FIG. 4, the latching mechanism 406 allows axial motion to take up tolerance when mating the plug and receptacle connectors together, The module adaptor 410 also floats a minimal amount horizontally and vertically within the insulator portion 414 of the housing to allow the chamfer 428 on the mating receptacle connector to tale up any misalignment in the horizontal and vertical directions. The floating mechanism functions in a similar fashion in FIG. 5 below but uses a stamped retention clip as opposed to the molded latch in FIG. 4.

FIG. 4 also includes receptacle connector assembly 404 with a USB style receptacle connector 418 and a circuit board 420 for terminating wires of the receptacle connector 418. A mid-plate with tongues 426 may be fitted in an aperture on a front face 430 of the receptacle connector assembly 404, where the aperture may include a lead-in chamfer 428.

In some examples, the module adaptor 410 may be over-molded with a molded-in seal to add sealing capability to the plug connector assembly. By using a molded insulator portion design with a latching mechanism cavity, an off-the-shelf shell may be used for the plug connector assembly. That is, different insulator portions may be used with a same shell for different plug connector types and configurations. The insulator portion may be made from various plastics or similar materials. For example, high-temperature nylon may be used for enhanced connector strength. Other example materials may include Mylar®, dacron, and similar ones. Through selection of the insulator portion material or addition of other materials, the plug and receptacle connector assemblies may be ruggedized (resistance against vibration, wear and tear), environmentally protected (heat, dust, humidity, etc.), and/or shielded against electromagnetic and/or electrostatic disturbances.

Figure 5:
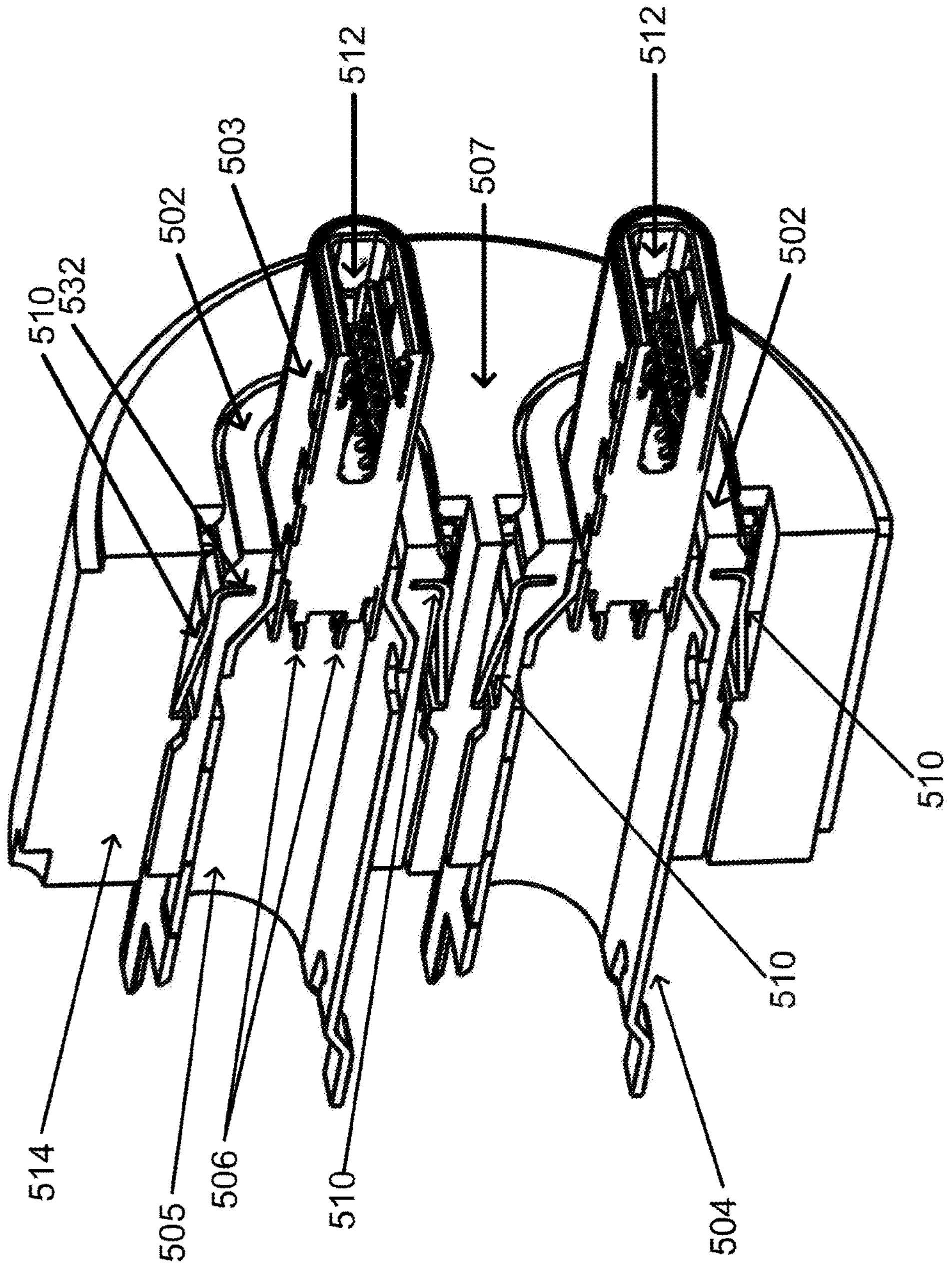
FIG. 5 illustrates cutaway perspective installation view of a plug of an example connector assembly showing retention details for another configuration.

FIG. 5 illustrates cutaway perspective installation view of a plug of an example connector assembly showing retention details for another configuration, arranged in accordance with at least some embodiments described herein.

An example plug connector assembly 500 shown in FIG. 5 includes two USB style plug connectors 504 arranged in parallel. The plug connectors 504 are enveloped in module adaptors 502 and inserted into an insulator portion 514 of the plug connector assembly. The module adaptors 502 (and thereby the plug connectors 504) may be held in place by a pair of retention clips 510 for each plug connector. Each retention clip may be made from a stamped spring material (e.g., metal or similar hard material) and may fit into a groove 532. Each plug connector may include an exposed tip portion 503 that contains spring pins 512 in an aperture to receive contacts of a corresponding receptacle. Each of the spring pins 512 may be connected to a wiring pin 506 on the opposite side of the plug connector. Wires may be soldered or crimped on to the wiring pins 506 inside a sheath 505 of the plug connector.

Similar to the mechanism discussed in FIG. 4, the exposed tip portions 503 of the plug connectors 504 may also be movable along two axes defining a plane of the mating surface 507 of the plug connector assembly 500 and/or along a third axis perpendicular to the plane. The movement(s) may be enabled by shapes, materials, and/or dimensions of the module adaptors 502 and/or the retention clips 510.

According to some examples, a connector assembly may be formed by forming a plug assembly and a receptacle assembly. The plug assembly may be formed by forming an insulator portion with two or more cavities and a mating surface. Then, a plug module adaptor may be formed to fit into one of the two or more cavities of the insulator portion, and each plug connector may be encapsulated by a plug module adaptor. The plug connectors may include multiple electrical connections and be electrically isolated from each other. Two or more plug module adaptors with respective plug connectors may be fitted into the two or more cavities of the insulator portion such that portions of the plug connectors protrude from the mating surface of the plug assembly. The insulator portion with the two or more plug module adaptors may be into a plug assembly shell. The receptacle assembly may be formed, similarly, by forming another insulator portion with two or more cavities and a mating surface. Then, a receptacle module adaptor may be formed to fit into one of the two or more cavities of the insulator portion, and each receptacle connector may be encapsulated by a receptacle module adaptor. The receptacle connectors may include multiple electrical connections and be electrically isolated from each other. Two or more receptacle module adaptors with respective receptacle connectors may be fitted into the two or more cavities of the insulator portion such that the receptacle connectors align with corresponding apertures on the mating surface of the receptacle assembly to mate with corresponding plug connectors of the plug assembly. The insulator portion with the two or more receptacle module adaptors may be into a receptacle assembly shell.

Figure 6:
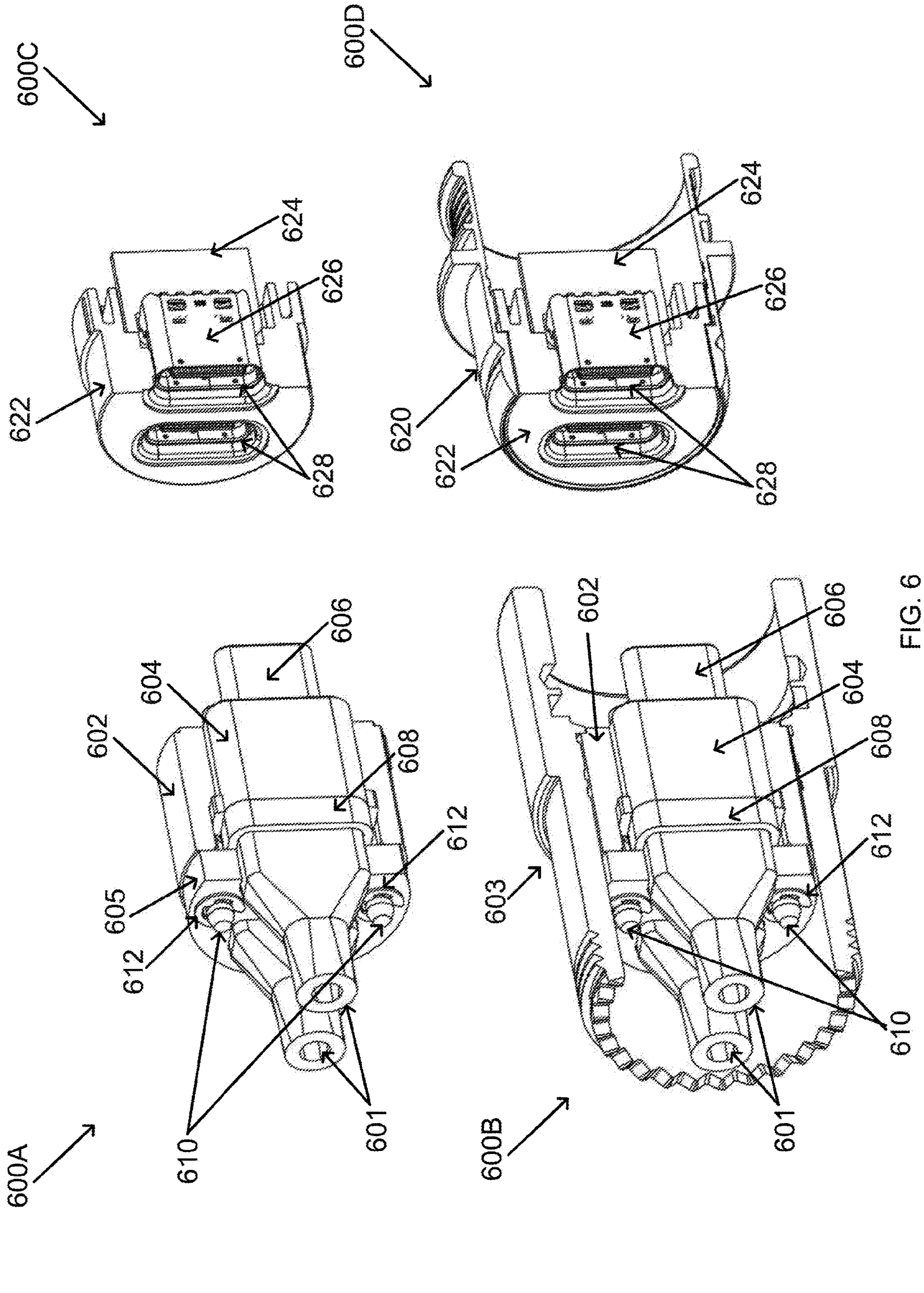
FIG. 6 illustrates cutaway perspective installation view of a plug-receptacle pair of an example connector assembly with post retention.

FIG. 6 illustrates cutaway perspective installation view of a plug-receptacle pair of an example connector assembly with post retention, arranged in accordance with at least some embodiments described herein.

In FIG. 6, diagram 600A shows a partial plug connector assembly with two USB style plug connectors and without a shell. The plug connector assembly includes plug connectors 601 with their conductive shells 606, insulator portion 602 of the connector assembly, and module adaptor 604. Diagram 600A further includes rear insulator 605, an elastomer or mechanical spring 608, posts 610, and retainer clips 612. Diagram 600B shows the same plug connector assembly inside shell 603.

Diagram 600C shows a matching receptacle connector assembly with two USB style receptacle connectors and without a shell. The receptacle connectors 626 with their openings 628 and mid-plates 624 are secured inside insulator portion 622 of the receptacle connector assembly. Diagram 600D shows the same receptacle connector assembly inside a shell 620.

In the shown example configuration, the elastomer or mechanical spring 608 is used to seal and provide a preload between the shell 603 and the mating receptacle connectors 626. The module adaptor 604 may be molded or mechanically attached to the shell 603, which itself may be conductive, and may be assembled into the insulator portion 602. The rear insulator 605 is anchored to the insulator portion 602 via posts 610 and retained by clips 612. When the plug and receptacle connectors are mated together the conductive shells 603 can bottom against the mating receptacles 626. Any axial tolerance may be taken up by the elastomer or mechanical spring 608 and transferred into the rear insulator 605 through the posts 610 and retention clips 612.

In some examples, off-the-shelf plug and receptacle connectors may be fitted with module adaptors and inserted into an accordingly shaped insulator portions of the shells 603, 620. Thus, the shells may also be off-the-shelf shells. The individual connectors in their respective module adaptors may be held in place through a latching mechanism. Alternatively, the insulator portion may be molded around the individual connectors. One or both of the plug or receptacle connectors may be hardwired to a circuit board. The plug or receptacle connectors may also be provided with wires. In case of wires, the wires of the individual connectors within a connector assembly may be in individual bundles (e.g., with matching connectors on the other end of the cables) or in a single cable bundle depending on implementation.

Figure 7:
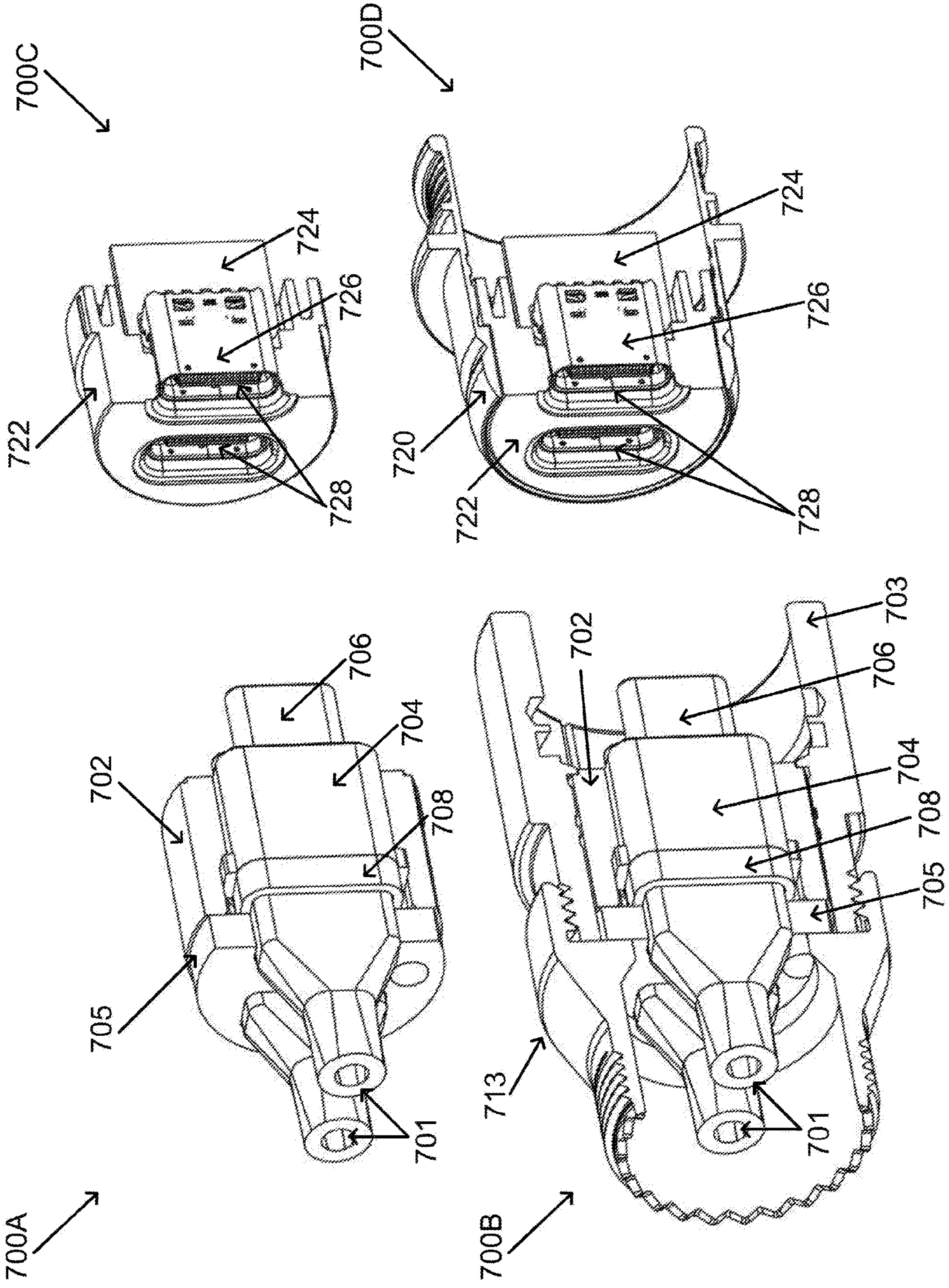
FIG. 7 illustrates cutaway perspective installation view of a plug-receptacle pair of an example connector assembly with backshell retention, all arranged in accordance with at least some embodiments described herein.

FIG. 7 illustrates cutaway perspective installation view of a plug-receptacle pair of an example connector assembly with backshell retention, arranged in accordance with at least some embodiments described herein.

Similar to FIG. 6, diagram 700A in FIG. 7 shows a partial plug connector assembly with two USB style plug connectors and without a shell. The plug connector assembly includes plug connectors 701 with their conductive shells 706, insulator portion 702 of the connector assembly, and module adaptor 704. Diagram 700A further includes rear insulator 705 and an elastomer or mechanical spring 708. Diagram 600B shows the same plug connector assembly inside shell 703 along with backshell 713.

Diagram 700C shows a matching receptacle connector assembly with two USB style receptacle connectors and without a shell. The receptacle connectors 726 with their openings 728 and mid-plates 724 are secured inside insulator portion 722 of the receptacle connector assembly. Diagram 700D shows the same receptacle connector assembly inside a shell 720.

In the shown configurations of FIG. 7, the rear insulator 705 is retained by the backshell 713. The rear insulator 705 retained by the backshell 713 allows the gasket to compress in axial direction (i.e., takes up the axial tolerance) and keeps the plug connectors 701 flush against the matching receptacle connectors 726. The posts and retention clips of FIG. 6 are not shown for simplicity in FIG. 7.

The benefits of the presently disclosed connector assembly devices are numerous. For example, the connector assemblies disclosed herein may allow robust and reliable multiple connections between different devices such as one computer and multiple peripheral devices. The modular configurations may allow in the field or at manufacturing selection of different connector types and/or numbers to be combined in a single connector assembly. Some example embodiments such as the latching mechanisms discussed in conjunction with FIGS. 3 and 4 may allow simple removal of plug connectors. Furthermore, by selecting materials and/or configuration of the insulator portion or by adding other materials, the connector assemblies may be ruggedized, environmentally insulated, and/or electromagnetically shielded. Multiple individual connectors, electrically isolated from each other, may be mated simultaneously through a single connector assembly, which not only enhances practical aspects of multiple connector use, but may also provide enhanced protection even in harsh environments.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. The terminology used herein is for the purpose of describing particular embodiments only and is not intended to be limiting.

The herein described subject matter sometimes illustrates different components contained within, or connected with, different other components. Such depicted architectures are merely examples, and in fact, many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A connector assembly comprising:
- a plug assembly comprising:
  - a first shell;
  - a first insulator portion arranged to be fitted inside the first shell, the first insulator portion having two or more cavities;
  - two or more module adaptors arranged to fit into the two or more cavities of the first insulator portion;
  - two or more plug connectors including a plurality of electrical connections, wherein each plug connector is encapsulated by a module adaptor of the plug assembly in a cavity of the first insulator portion and at least one plug connector floats along one or more axes relative to a mating surface of the plug assembly;
  - a latching mechanism within the first insulator portion to secure one of the two or more plug connectors, the latching mechanism comprising a finger latch made from a same material as the first insulator portion or a retention clip made from a different material as the first insulator portion; and an insertion opening on the mating surface of the plug assembly for insertion of a removal tool to release the latching mechanism; and a receptacle assembly comprising:

a second shell;

a second insulator portion arranged to be fitted inside the second shell, the second insulator portion having two or more cavities;

two or more module adaptors arranged to fit into the two or more cavities of the second insulator portion; and two or more receptacle connectors including a plurality of electrical connections, wherein each receptacle connector is encapsulated by a module adaptor of the receptacle assembly in a cavity of the second insulator portion, at least one receptacle connector is configured to float along one or more axes relative to a mating surface of the receptacle assembly, and portions of the two or more plug connectors protrude from the mating surface of the plug assembly to mate with corresponding receptacle connectors of the receptacle assembly.

2. The connector assembly of claim 1, wherein the plug connectors are electrically isolated from each other; and/or the receptacle connectors are electrically isolated from each other.

3. The connector assembly of claim 1, wherein the two or more plug connectors and the two or more receptacle connectors are:

hardwired to respective circuit boards, wired to individual cables, or wired to cables bundled together for the plug assembly or the receptacle assembly.

4. The connector assembly of claim 1, wherein the plug assembly and the receptacle assembly are configured to mate through an O-ring on an inside surface of the first shell and a corresponding groove on an outside surface of the second shell.

5. The connector assembly of claim 1, wherein the plug assembly and the receptacle assembly are configured to mate through matching sets of threads on an inside surface of the first shell and an outside surface of the second shell or a set of screws to hold the first shell and the second shell together.

6. The connector assembly of claim 1, wherein a material and a shape of one or more of the first shell, the second shell, the first insulator portion, the second insulator portion, or the two or more module adaptors are selected such that the plug assembly and/or the receptacle assembly are ruggedized, environmentally sealed, or electromagnetically shielded.

7. The connector assembly of claim 1, wherein the two or more plug connectors and the two or more receptacle connectors include universal serial bus (USB) standard version 3.0 (or higher) category C type connectors, USB version 2.0 category B micro style connectors, USB version 2.0 or version 3.0 category B mini style connectors, or High-Definition Multimedia Interface (HDMI) style connectors arranged parallel, perpendicular, or at a predefined angle to each other.

8. A connector assembly comprising:

a plug assembly comprising:

a first shell;

a first insulator portion arranged to be fitted inside the first shell; and two or more plug connectors partially within the first insulator portion, wherein the first insulator portion is molded over the two or more plug connectors, each plug connector includes a plurality of electrical connections, and each plug connector is electrically isolated from other plug connectors;

an elastomer or mechanical spring configured to:

surround a portion of each plug connector;

seal the first shell; and provide a preload between the first shell and the two or more receptacle connectors; and a rear insulator anchored to the first insulator portion via one or more posts and retainer clips; and a receptacle assembly comprising:

a second shell;

a second insulator portion arranged to be fitted inside the second shell; and two or more receptacle connectors within the second insulator portion, wherein the second insulator portion is molded over the two or more receptacle connectors, each receptacle connector includes a plurality of electrical connections, each receptacle connector is electrically isolated from other receptacle connectors, and portions of the two or more plug connectors protrude from a surface of the plug assembly to mate with corresponding receptacle connectors of the receptacle assembly.

9. The connector assembly of claim 8, further comprising:

a backshell mechanically coupled to the first shell and configured to retain the rear insulator.

10. The connector assembly of claim 8, wherein the plug assembly and the connector assembly are configured to mate through:

an O-ring on an inside surface of the first shell and a corresponding groove on an outside surface of the second shell;

matching sets of threads on the inside surface of the first shell and the outside surface of the second shell; or a set of screws to hold the first shell and the second shell together.

11. A method for manufacturing a connector assembly, the method comprising:

forming a plug assembly by:

forming a first insulator portion with two or more cavities and a first mating surface;

forming a first module adaptor arranged to fit into one of the two or more cavities of the first insulator portion;

encapsulating a plug connector that includes a plurality of electrical connections with the first module adaptor;

fitting two or more first module adaptors with respective plug connectors into the two or more cavities of the first insulator portion such that portions of the plug connectors protrude from the first mating surface of the plug assembly and at least one of the plug connectors float along one or more axes relative to the first mating surface;

forming a latching mechanism within the first insulator portion to secure the first module adaptor by:

forming a finger latch made from a same material as the first insulator portion or a retention clip made from a different material as the first insulator portion; and forming an insertion opening on the first mating surface for insertion of a removal tool to release the latching mechanism; and fitting the first insulator portion with the two or more first module adaptors into a first shell; and forming a receptacle assembly by:

forming a second insulator portion with two or more cavities and a second mating surface;

forming a second module adaptor arranged to fit into one of the two or more cavities of the second insulator portion;

encapsulating a receptacle connector that includes a plurality of electrical connections with the second module adaptor;

fitting two or more second module adaptors with respective receptacle connectors into the two or more cavities of the second insulator portion such that the receptacle connectors align with corresponding apertures on the second mating surface to mate with corresponding plug connectors of the plug assembly and at least one of the receptacle connectors floats along one or more axes relative to the second mating surface; and fitting the second insulator portion with the two or more second module adaptors into a second shell.

12. The method of claim 11, further comprising:

one or more of:

hardwiring the plug connectors and the receptacle connectors to respective circuit boards, wiring the plug connectors and the receptacle connectors to individual cables, or wiring the plug connectors and the receptacle connectors to cables bundled together for the plug assembly or the receptacle assembly.

13. The method of claim 11, further comprising:

forming one or more of:

an O-ring on an inside surface of the first shell and a corresponding groove on an outside surface of the second shell to mate the plug assembly and the receptacle assembly;

matching sets of threads on the inside surface of the first shell and the outside surface of the second shell to mate the plug assembly and the receptacle assembly; or a set of screw holes on the first shell and the second shell to hold the plug assembly and the receptacle assembly together.

14. A universal serial bus (USB) connector assembly comprising:

a plug assembly comprising:

a first shell;

a first insulator portion arranged to be fitted inside the first shell, the first insulator portion having two or more cavities;

two or more module adaptors arranged to fit into the two or more cavities of the first insulator portion;

two or more USB plug connectors arranged parallel, perpendicular, and/or at an angle to each other, wherein each USB plug connector is encapsulated by a module adaptor of the plug assembly in a cavity of the first insulator portion, floats along one or more axes relative to a mating surface of the plug assembly, and protrudes from the mating surface of the plug assembly;

a latching mechanism within the first insulator portion to secure the two or more USB plug connectors, the latching mechanism comprising a finger latch made from a same material as the first insulator portion or a retention clip made from a different material as the first insulator portion; and an insertion opening on the mating surface of the plug assembly for insertion of a removal tool to release the latching mechanism; and a receptacle assembly comprising:

a second shell;

a second insulator portion arranged to be fitted inside the second shell, the second insulator portion having two or more cavities; and two or more USB receptacle connectors arranged to fit into the two or more cavities of the second insulator portion, wherein the USB receptacle connectors align with apertures on a mating surface of the receptacle assembly to match corresponding two or more USB plug connectors and the USB receptacle connectors.

15. The USB connector assembly of claim 14, wherein the plug assembly and the connector assembly are configured to mate through:

an O-ring on an inside surface of the first shell and a corresponding groove on an outside surface of the second shell;

matching sets of threads on the inside surface of the first shell and the outside surface of the second shell; or a set of screws to hold the first shell and the second shell together.

* * * * *